United States Patent
Fiannaca

[15] 3,638,234
[45] Jan. 25, 1972

[54] QUANTITY RECORDER

[72] Inventor: James R. Fiannaca, Rochester, N.Y.

[73] Assignee: Metrix Data Systems, Inc., Rochester, N.Y.

[22] Filed: Feb. 24, 1969

[21] Appl. No.: 801,638

[52] U.S. Cl. ................................. 346/95, 346/98, 346/143
[51] Int. Cl. ............................................................ G01d 4/00
[58] Field of Search .................... 346/14 MR, 78, 82, 94, 95, 346/104, 141, 143; 234/45, 121

[56] References Cited

UNITED STATES PATENTS

| | | | |
|---|---|---|---|
| 1,727,966 | 9/1929 | Dement | 346/104 X |
| 2,778,707 | 1/1957 | Webster | 346/141 X |
| 2,789,028 | 4/1957 | Kotschubey et al. | 346/78 |
| 3,001,846 | 9/1961 | Franceschini | 346/19 |
| 3,084,013 | 4/1963 | Brett | 346/89 |
| 3,108,742 | 10/1963 | Schacht | 234/45 X |
| 568,033 | 9/1896 | Mehling | 346/95 |
| 1,242,093 | 10/1917 | Weeks | 346/95 |

*Primary Examiner*—Joseph W. Hartary
*Attorney*—Cumpston, Shaw & Stephens

[57] ABSTRACT

A quantity recorder advances punch sets repeatedly at different rates from the beginning to the end of respective paths as a function of the quantity measured and includes means for operating the punch sets to punch their path positions into a card to record the quantity. Recorders other than punch sets can also be used, and the device is useful for recording the quantities measured by utility meters.

6 Claims, 2 Drawing Figures

PATENTED JAN 25 1972 3,638,234

INVENTOR
JAMES R. FIANNACA

BY Crumpston, Shaw
and Stephens

ATTORNEY

QUANTITY RECORDER

THE NEED FOR IMPROVEMENT

Meter reading to record and use measured quantities is expensive, slow, and often produces errors. Such meter reading is particularly burdensome for utility meters measuring the quantities of water, gas, or electricity consumed, but similar meter reading is required in many other operations such as fuel delivery, weight, pipeline flow, etc.

The objects of this invention are to reduce the cost and improve the accuracy of quantity recording, and the inventive recorder aims at simplicity, accuracy, economical manufacture, foolproof operation compatibility with existing data processing equipment, billing systems, etc., all in a tamper-proof device.

SUMMARY OF THE INVENTION

The inventive recorder is driven by a meter shaft turned as a function of the measured quantity and uses drive trains to advance a number or recording elements at different rates as a function of the quantity. The recording elements advance in paths from initial positions to final positions where they are released for return to their initial positions, and each element is preferably advanced in successive 1:10 relative ratios for decimal indication of the quantity.

The recording elements can be punch sets as illustrated, or other devices such as magnetic recorders, embossing recorders, mark printing recorders, etc. An actuator operates all of the recording elements simultaneously to record their various positions along their respective paths on a record medium to indicate and record the quantity measured. The record medium is preferably read by machine for billing or data handling purposes.

DRAWINGS

FIG. 1 is a partially cutaway elevational view of a preferred embodiment of the inventive recorder; and FIG. 2 is a schematic illustration of the drive trains for the recording elements of the device of FIG. 1.

DETAILED DESCRIPTION

Figure 1:
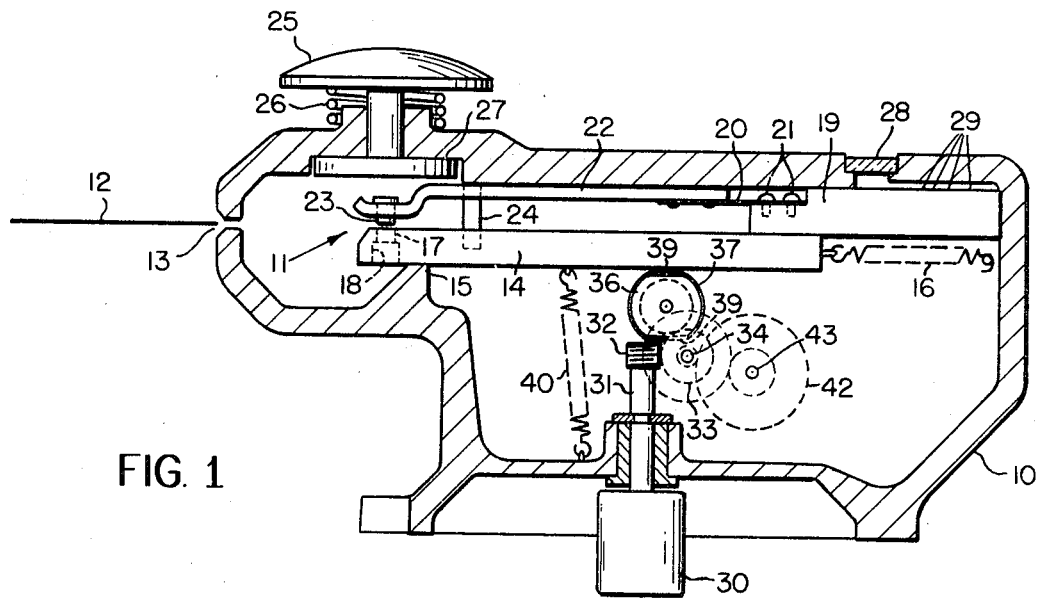
Figure 2:
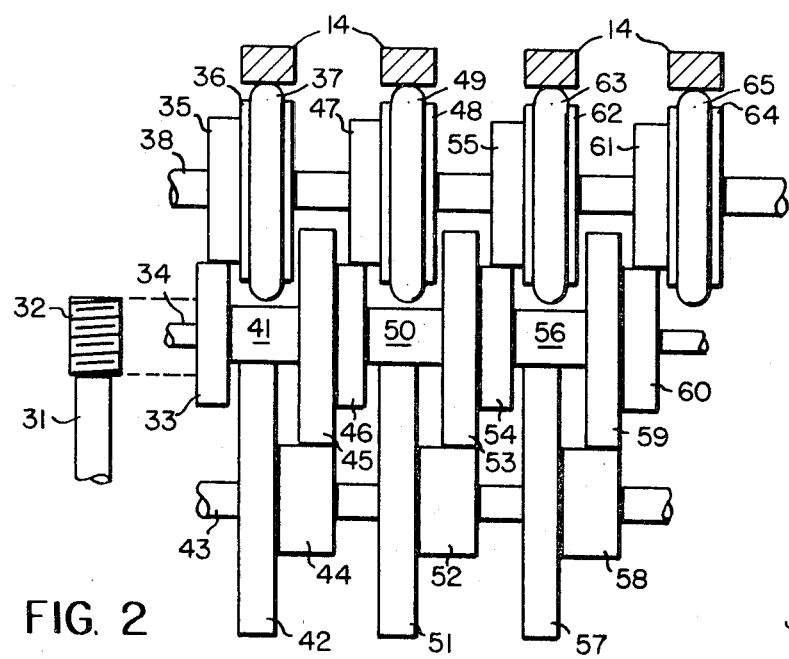

The drawings illustrate one simple preferred embodiment of the inventive recorder using punch sets as the record-making elements. Such a device is designed generally for utility meters for water, gas, or electricity. However, the invention is applicable to many other circumstances in which metered quantities must be recorded, and it can use recording elements other than punch sets, such as magnetic recorders, embossing recorders, mark-printing devices, etc.

Housing 10 contains 4 punch sets 11 advanced at different rates for punching their positions into record card 12 inserted through slot 13 in housing 10. Each of the punch sets 11 has a base 14 supported for sliding across ledge 15 and biased toward the illustrated initial position by a spring 16. Base arm 14 has a female die opening 17 communicating with a hole 18 opening at the bottom of arm 14. A block 19 is secured to the top of base arm 14, and a resilient or spring arm strip 20 is secured to block 19 by screws 21. A movable arm 22 resiliently supported by spring strip 20 extends over base arm 14, and carries male die 23 in registry with female die 17. Enlarged holes in spring strip 20 receiving screws 21 allow adjustment of arm 22 for accurate registry of dies 17 and 23. Stops 24 extend from housing 10 to positions between base arms 14 to limit the insertion of card 12 into housing 10. A plunger 25 biased upward to the illustrated position by spring 26 carries a plate 27 for engaging the tops of movable arms 22.

To record the measured quantity, card 12 is inserted through slot 13 and in between base arm 14 and movable arm 22 until it engages stops 24. Then, plunger 25 is manually pressed down so plate 27 hits the tops of movable arms 22 and drives their dies 23 into dies 17 to punch holes in card 12.

Punch sets 11 are driven from the illustrated initial position toward slot 13 by a drive train described below. Such advancement moves block 19 under window 28, and numbers on the top of block 19 in regions 29 are successively displayed in window 28 for visually reading the quantity measured.

Housing 20 is preferably secured to a meter or measuring device having a shaft turned as a function of the quantity measured. A coupling 30 is secured to such meter shaft for turning shaft 31 inside housing 10. A worm gear 32 on shaft 31 meshes with gear 33 on shaft 34. Gear 33 meshes with gear 35 which is fixed to friction wheel 36 that is loosely rotatable on shaft 38 and carries an O-ring 37 as a friction surface or tire. O-ring 37 engages the bottom of base arm 14 for a driving engagement.

Wheel 35 has two peripheral portions 39 that are formed as flat spots so that O-ring 37 does not have a firm driving engagement with base arm 14 when flat spots 39 are adjacent base arm 14. When the full radius periphery of wheel 36 is adjacent base arm 14, O-ring 37 is compressed against the bottom of base arm 14 for a firm driving engagement against the bias of spring 16. Springs 40 hold each base arm 14 down against its respective drive wheel for such purpose.

Gear 41 is integral with gear 33 and meshes with gear 42 that is preferably free-turning on shaft 43. Gear 44 is integral with gear 42 and meshes with gear 45 that is free-turning on shaft 34. Gear 46 is integral with gear 45 and meshes with gear 47 on a successive drive wheel 48 having an O-ring 49. Gears 41, 42, 44, 45, 46 and 47 are preferably proportioned for driving wheel 48 at a 1:10 ratio to wheel 36. One simple way for accomplishing this is to make gears 41 and 42 in the ratio of 1:5, gears 44 and 45 in the ratio of 1:2, and gears 46 and 47 in the ratio of 1:1 for advancing wheel 48 at one-tenth the rate of advancement of wheel 36. This same successive 1:10 relationship is preferably repeated through gears 50–61, all freely turning on their respective shafts, for advancing wheels 52 and 64 with their respective O-rings 63 and 65 at rates successively one-tenth of their predecessor. Other gear drives and ratios can be used within the spirit of the invention, but successive 1:10 ratios for the drive wheels for each successive punch s et are preferred for a decimal recording of the measured quantity.

As an alternative to drive wheels 36, 48, 62, 64, etc., with their respective O-rings, drive gears can be substituted with teeth meshing with racks formed on the bottom of base arms 14. Such drive gears would have missing teeth in the locations corresponding to flat spots 39 to release base arms 14 for return to their initial position under the bias of spring 16 when the missing tooth positions register with the racks on base arms 14. Of course, different numbers of flat spots or missing teeth can be used depending on the size of the drive elements and the travel distance of the recording elements.

In operation, shaft 31 is turned to drive worm gear 32 and the gear trains to advance each successive punch set 11. As the quantity increases, the first punch set is moved from its illustrated position to a final position at which a flat spot 39 on drive wheel 36 comes adjacent base arm 14 to let the punch snapback to the illustrated position under the bias of its respective spring 16. Meanwhile, the successive punch set driven by wheel 48 has advanced one-tenth of its travel from its initial position to its final position. After repeated advancements of the first punch set, the second punch set completes one course of travel and returns to its initial position, and the third punch set has advanced one-tenth of its travel. This can be multiplied for as many punch sets as required to indicate the quantity measured.

At any time during this process, card 12 can be inserted into housing 10 and plunger 25 actuated for punching the path positions of punch sets 11 into card 12. The holes in card 12 can then be read by machine to sense the quantity recorded and perform other operations such as billing.

The holes or other marking on card 12 are preferably read by conventional digital equipment, and since such marks will have infinitely variable positions along the paths of each recording element 11, the area punched out by dies 23 and 17 is preferably longer than usual in the direction of travel of punch sets 11 so that at least one digital marking spot is covered by the punch area regardless of the position of punch set 11 along its path. The reading equipment is preferably programmed to eliminate any ambiguity in the sensing of two punch mark positions in a single row.

Persons wishing to practice the invention should remember that other embodiments and variations can be adapted to particular circumstances. Even though one point of view is necessarily chosen in describing and claiming the invention, this should not inhibit broader or related applications within the spirit of the invention. For example, many different arrangements of drive gears or wheels are possible. The advancement ratios of successive recording elements need not be 1:10, recording elements can be supported and spring biased in a number of ways, and other means can be used for operating the recording elements to record their positions on card 12.

I claim:

1. A quantity recorder comprising:
   a. a housing having a shaft rotatable in direct proportion to said quantity;
   b. a plurality of drive members turned by said shaft for advancing at different rates relative to said shaft;
   c. a corresponding plurality of driven elements arranged for advancement by respective ones of said drive members each of said drive elements being arranged to advance along a path from an initial position to a final position as a direct analog of said quantity;
   d. each of said elements being biased toward said initial position;
   e. each of said drive members being arranged for releasing the corresponding one of said driven elements at said final position for return to said initial position;
   f. a recording element carried on each of said driven elements for advancement along said paths with said driven elements;
   g. means for simultaneously operating said recording elements anywhere along said paths to produce a record of the positions of said driven elements along said paths to indicate said quantity;
   h. said driven elements comprise punch sets normally parted to receive a card for said record, and said operating means comprises a plunger for forcing said punched sets closed to punch said card to produce said record; and
   i. said punch sets each comprise a base arm and a movable arm resiliently held above said base arm, said housing includes support means for said base arms, and said plunger is disposed for pressing down said movable arms.

2. The quantity recorder of claim 1 wherein said movable arm comprises a resilient strip secured to said base arm.

3. The quantity recorder of claim 1 including gear trains arranged in series for advancing each successive one of said driven elements; the drive ratio for each successive one of said driven elements being 1:10; said quantity is the measurement of a utility meter, said housing is secured to said utility meter, and said rotatable shaft is turned as a function of said measurement of said utility meter; a window is arranged in said housing and numbers arranged on said driven elements appear in said window to indicate said quantity; and said means for advancing said drive members includes a shear pin.

4. The quantity recorder of claim 3 wherein said movable arm comprises a resilient strip secured to said base arm.

5. The quantity recorder of claim 3 wherein said drive members comprise friction wheels having peripheral portions of less than full radius to provide said releasing of said driven elements.

6. The quantity recorder of claim 3 wherein said drive members comprise gears, said driven elements include racks meshed with said drive gears, and said drive gears have missing teeth located to provide said releasing of said driven elements.

* * * * *